Figure 1:
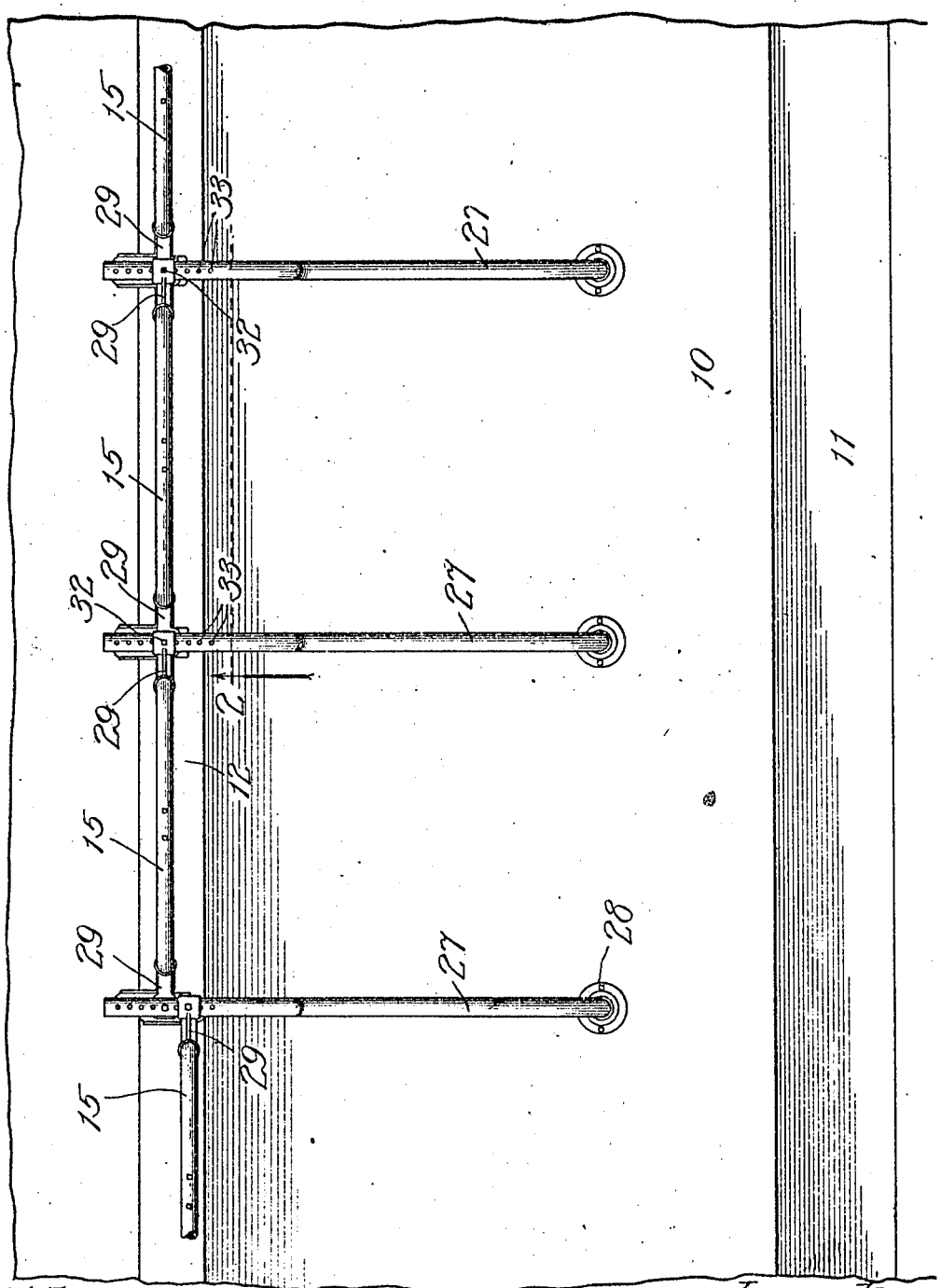

H. L. FERRIS.
ANIMAL STALL.
APPLICATION FILED AUG. 17, 1910.

988,561.

Patented Apr. 4, 1911.
3 SHEETS—SHEET 1.

Witnesses:
Chas. E. Gaybird.
Chas. H. Buell.

Inventor
Henry L. Ferris.
By Dyrenforth, Lee, Chritton & Wiles
Attys.

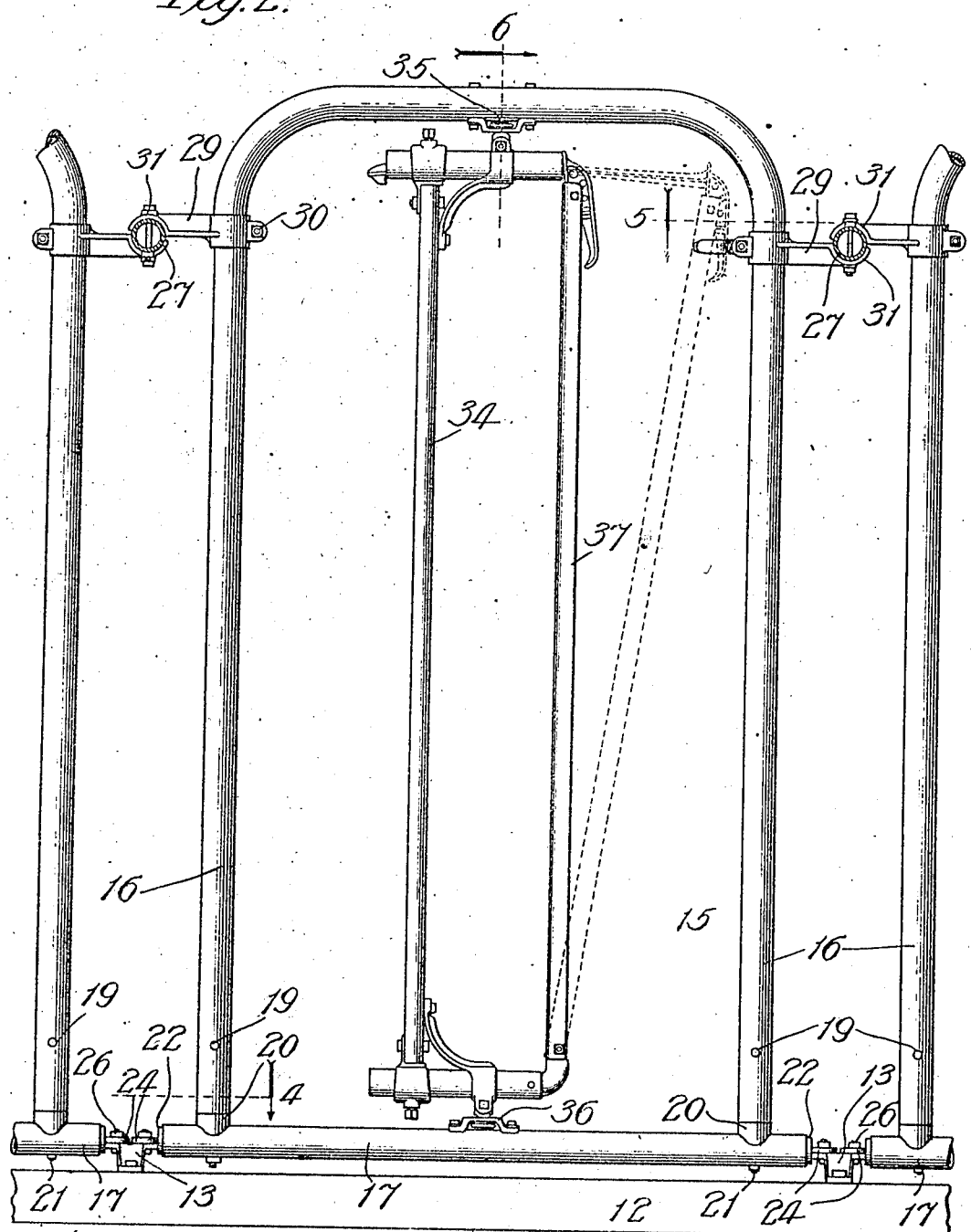

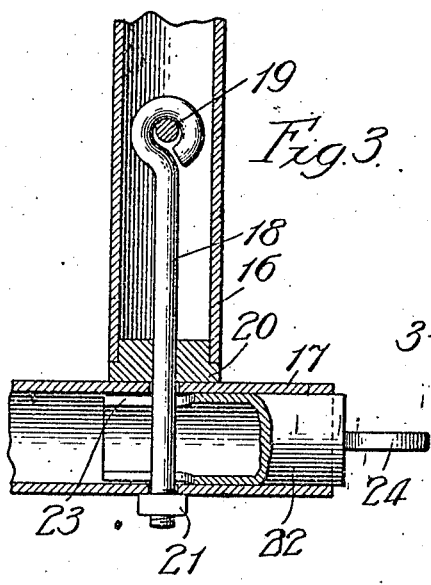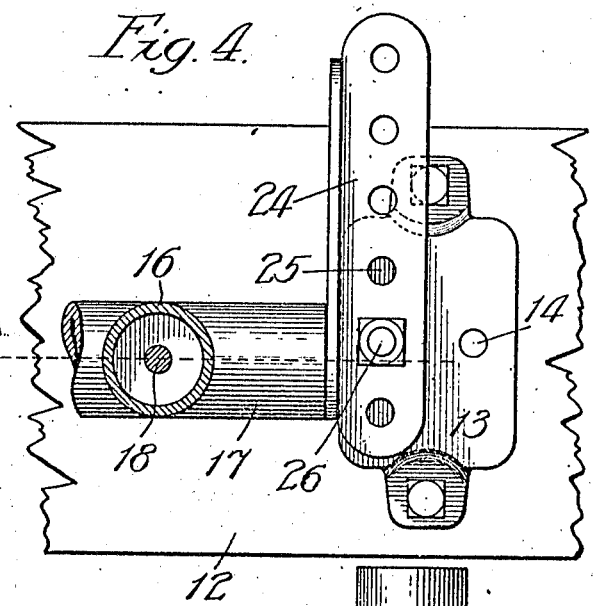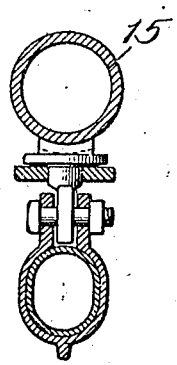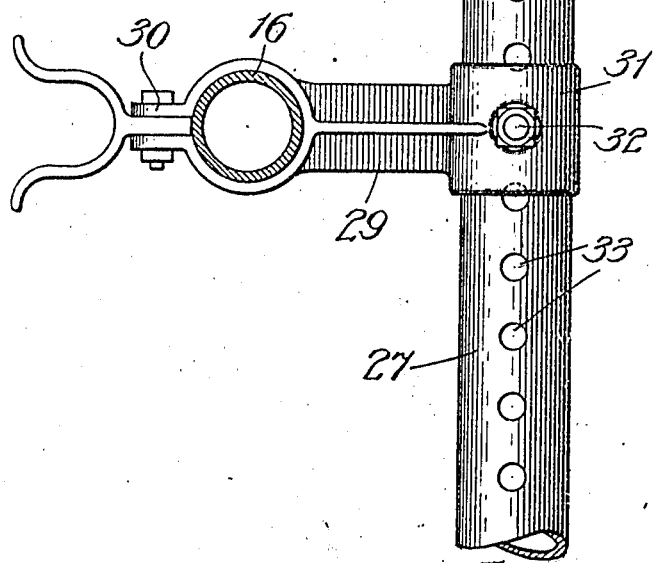

UNITED STATES PATENT OFFICE.

HENRY L. FERRIS, OF HARVARD, ILLINOIS, ASSIGNOR TO HUNT, HELM, FERRIS & COMPANY, A CORPORATION OF ILLINOIS.

ANIMAL-STALL.

988,561.  Specification of Letters Patent.  Patented Apr. 4, 1911.

Application filed August 17, 1910. Serial No. 577,600.

*To all whom it may concern:*

Be it known that I, HENRY L. FERRIS, a citizen of the United States, residing at Harvard, in the county of McHenry and State of Illinois, have invented a new and useful Animal-Stall, of which the following is a specification.

It is the common practice in constructing animal-stalls to form the front sections thereof integrally, with the disadvantage of rendering impossible the disconnection of any one of the stalls from the others forming the group; and a further disadvantage of preventing the addition to the stalls thus provided, of other stalls where it is desired that additional stalls be added to such group.

One of the objects of my invention is to provide a construction of stall which will overcome the disadvantages above set forth, and thereby permit the stalls to be grouped as desired, and the number of stalls be increased and diminished as conditions require.
Other objects are to provide a simple construction of stanchion-supporting frame which may be readily adjusted with relation to the gutter, usually provided in stall-constructions, for receiving the droppings from the animals, in order that the animals, regardless of their length, may be properly positioned with relation to the gutter; and generally to so improve stalls as to render them better adapted to the purpose for which they are provided.

Referring to the accompanying drawings—Figure 1 is a plan view of a group of stalls constructed in accordance with my invention. Fig. 2 is an enlarged section taken at the line 2 on Fig. 1 and viewed in the direction of the arrow. Fig. 3 is an enlarged view in sectional elevation of a detail of the connection between one of the upright bars and lower cross-member of the stanchion-supporting frame and an adjusting member carried thereby; and Figs. 4, 5 and 6, sections taken at the lines 4, 5 and 6, respectively, on Fig. 2 and viewed in the directions of the arrows.

The floor of the stalls is represented at 10 and is shown as provided with the usual gutter 11 for receiving the droppings from the animals. Forward of the gutter 11 and extending longitudinally thereof, is a raised section 12 which may be a timber, or an integral part of the floor when the latter is of concrete. Secured along the top of the section 12 and extending transversely thereof in spaced relation, are U-shaped brackets 13, the web-portion of each of which contains at opposite sides thereof an opening 14, it being preferred that these brackets be permanently secured to the section 12. Located in the spaces between these brackets are upright stanchion-supporting frames 15 each of which is formed of an inverted U-shaped member 16 preferably constructed of iron tubing bent into the shape illustrated, and a lower cross-bar 17 connected with the lower ends of the member 16. The bar 17 at each end is preferably connected with the member 16 through the medium of an eye-bolt 18, the upper end of which surrounds a cross-pin 19 secured in the member
16. The bolt 18 passes through a plug 20, confined in the lower end of the member 16, and through the cross-bar 17 and carries a nut 21 for clamping these parts rigidly together. Confined in the opposite open ends of the bar 17 are members 22 containing longitudinally-extending slots 23 at which these members straddle the bolts 18, the outer ends of the members 22 carrying horizontally-disposed bars 24 which extend at right-angles to the members carrying them and contain a series of openings 25. The plates 24 preferably extend almost wholly to one side of their supporting members 22, as clearly illustrated in Fig. 4. The brackets are so located as to cause the plates 24 to be superposed thereon when the frames 15 are positioned as described, bolts 26, or any other suitable fastening means, passing through the registering openings 14 and 25 for holding the frames 15 in any desired position of adjustment at their lower ends.

The partitions for the stalls are represented at 27, each being preferably formed of a bar secured at one end to the floor 10 as indicated at 28 and extending at its upper rear end to a point slightly below the top of the frames 15 and intermediate adjacent pairs of the latter as represented in Fig. 2. Each of the frames 15 carries brackets 29 which surround the bars 16 toward their upper ends and are clamped thereto as by bolts 30, the outer ends of these brackets terminating in semi-circular heads 31. The heads 31 partially surround the upper rear ends of the adjacent bars 27 and are connected therewith in any desired position of adjustment, as by bolts 32 passing through openings in the heads 31 and openings 33 in the bars 27, a plurality of the openings 33 being provided for the purposes of adjustment.

The frame 15 may be equipped with any desirable form of stanchion, the variety illustrated comprising, generally stated, a yoke-frame 34 pivoted at its upper and lower ends to the frame 15 and cross-member 17, respectively, as indicated at 35 and 36, a swinging bar 37 pivoted at its lower end to the yoke 34 and carrying a lever 38 pivoted thereto at its upper end as indicated at 39 and lying within a tubular section of the frame 34. The outer end of the lever 38 is provided with a shoulder 40 which, when the bar 37 is positioned for use, as illustrated in full lines in Fig. 2, locks the lever 38 against withdrawal from the tube, the shoulder 40 being releasable for permitting the bar 37 to swing to the position illustrated by dotted lines in Fig. 2, by swinging the lever 38 on its pivot.

Each of the frames 15 is adjustable independently of the others back and forth upon the brackets 13 and the bars 27 for positioning the stanchions carried thereby in order that the animals confined in the stanchions may be so positioned with relation to the gutter as to cause their droppings to fall into the latter, this being of advantage in stall constructions, as it enables the result just stated, to be accomplished regardless of the length of the animals.

It is preferred that the brackets 29 on opposite sides of each frame 15 be so positioned as to cause them to embrace the bars 27 from above and below, or, as represented in Fig. 2, to permit the frames 15 to be alined, when desired, as illustrated of the three frames on the right-hand side of the construction illustrated in Fig. 1.

By constructing the bars 24 and their supports, as described, a wide range of adjustment of the frames 15 upon the brackets 13 may be effected as the members 22 may be removed from the bars 17 and replaced in a position reversed with relation to that illustrated in Fig. 4, to cause the plates 24 to extend in the direction opposite to that illustrated in this figure, this being a desirable feature of the construction as no projecting parts of the adjusting devices are in a position to injure the animals.

It will be noted from the foregoing that each stanchion-supporting frame is formed independently of the others and that by providing releasable connectors between each of such frames, as many of the latter may be grouped together as desired, to form a series of connected frames and that such arrangement of frames permits of the ready adding to or subtracting from the number of stalls initially provided, as conditions require, without destroying the desired uniformity of structure. Furthermore, any one or more of intermediate frames of the series may be removed without affecting the others, as where it is desired that a passage-way between frames be provided. In fact by providing the frames in units, they may be grouped and regrouped as conditions require without impairing the usefulness or uniformity of the structure.

What I claim as new, and desire to secure by Letters Patent, is—

1. The combination of a series of stanchion-supporting frames, partitions extending at an angle to said frames and located adjacent to the ends thereof, and means adjustably connecting said frames independently of each other with said partitions, for the purpose set forth.

2. The combination with a floor, of supports secured thereto, a series of stanchion-supporting frames adjustably connected at their lower ends with said supports, partitions extending at an angle to said frames and located adjacent to the ends thereof, and means adjustably connecting said frames with said partitions, whereby said frames are adjustable independently of each other lengthwise of said partitions, for the purpose set forth.

3. The combination with a floor, of a plurality of spaced supporting members secured thereto, a series of stanchion-supporting frames located between said supports with each of the intermediate ones of said supports connected with two of said frames, partitions extending at an angle to said frames and located at the opposite ends thereof, and means connecting said frames toward their upper ends to said partitions, for the purpose set forth.

4. The combination of a series of stanchion-supporting frames, partitions interposed between said frames and extending at an angle thereto, the rear end of said partitions being located adjacent to the frames, and coupling-devices carried by said frames at their opposite ends and engaging with the rear ends of said partitions, for securing said frames and partitions together.

5. A stanchion-supporting frame provided with members by which it is adapted to be supported, said members being provided with extensions projecting transversely of said frame and beyond a side thereof, and being adjustable on said frame to cause said extensions to project beyond either side of said frame, for the purpose set forth.

6. A stanchion-supporting frame provided toward its opposite ends with sockets, means for supporting said frame formed of members fitting in said sockets and provided with extensions projecting beyond the side of the frame, said members being adjustably connected with the frame for permitting said extensions to project beyond either side of said frame, for the purpose set forth.

7. A stanchion-supporting frame formed of a tubular cross-member and tubular side members, vertically-extending bolts connecting said members together and extending through said cross-member, means for supporting said frames at their lower ends formed of slotted members confined in the ends of said cross-member and straddling said bolts, and extensions secured to said members and projecting beyond a side of said frame, said members being movable longitudinally of said cross-member for permitting said members to be adjusted upon said cross-member for positioning said extensions beyond either side of said frame.

8. The combination of a stanchion-supporting frame formed of a lower cross-member having its opposite ends constructed to receive means for securing the frame in position, and an inverted U-shaped member connected at its lower ends with said cross-member and having its top and sides integral, with the ends of the cross-member extending beyond said U-shaped frame.

9. The combination of a stanchion-supporting frame formed of a lower cross-member having its opposite ends recessed to receive means for securing the frame in position, an inverted U-shaped tubular member having its top and sides integral, with the ends of the cross-member extending beyond said U-shaped frame, and connecting means for said U-shaped frame and cross-member formed of bars carried by the ends of said U-shaped member and passing through the cross-member, and means engaging with the protruding ends of the bars for clamping said U-shaped member to the cross-piece.

HENRY L. FERRIS.

In presence of—
  R. N. JACOBS,
  R. A. HEMENWAY.